(12) United States Patent
Parks

(10) Patent No.: US 8,690,124 B2
(45) Date of Patent: Apr. 8, 2014

(54) GATE VALVE

(75) Inventor: Glenn C. Parks, Cypress, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 327 days.

(21) Appl. No.: 12/966,704

(22) Filed: Dec. 13, 2010

(65) Prior Publication Data

US 2011/0140027 A1   Jun. 16, 2011

Related U.S. Application Data

(60) Provisional application No. 61/285,838, filed on Dec. 11, 2009.

(51) Int. Cl.
*F16K 3/00*   (2006.01)

(52) U.S. Cl.
USPC .......................... 251/327; 251/328; 251/329

(58) Field of Classification Search
USPC .......... 251/326–329, 366, 193, 195, 196, 199
See application file for complete search history.

(56) References Cited

U.S. PATENT DOCUMENTS

| | | | | |
|---|---|---|---|---|
| 1,734,866 A * | 11/1929 | Law | ............... | 251/196 |
| 1,803,889 A * | 5/1931 | Bohnhardt et al. | ........... | 251/176 |
| 2,148,628 A * | 2/1939 | Laurent | ........... | 137/246 |
| 2,954,044 A * | 9/1960 | Volpin | ........... | 137/246.12 |
| 2,977,975 A * | 4/1961 | Allen | ........... | 137/330 |
| 2,977,976 A * | 4/1961 | Allen | ........... | 137/330 |
| 3,078,871 A * | 2/1963 | Magos | ........... | 137/546 |
| 3,662,778 A * | 5/1972 | Leopold et al. | ........... | 137/375 |
| 3,768,774 A | 10/1973 | Baugh | | |
| 3,850,237 A | 11/1974 | Ahlstone et al. | | |
| 3,889,925 A * | 6/1975 | Brooks | ........... | 251/327 |
| 3,937,251 A | 2/1976 | Ahlstone et al. | | |
| 4,281,819 A * | 8/1981 | Linder | ........... | 251/328 |
| 4,487,393 A * | 12/1984 | Eagen | ........... | 251/328 |
| 4,588,164 A | 5/1986 | Kemp | | |
| D291,723 S | 9/1987 | Kemp | | |
| 4,730,806 A | 3/1988 | Krasnov | | |
| 4,771,805 A | 9/1988 | Maa | | |
| 4,795,128 A | 1/1989 | Krasnov et al. | | |
| 5,103,786 A * | 4/1992 | Suzuki et al. | ........... | 123/323 |
| 5,192,051 A | 3/1993 | Roberson | | |
| 5,291,912 A | 3/1994 | Comeaux | | |
| 5,370,362 A * | 12/1994 | Kent et al. | ........... | 251/326 |
| 5,826,658 A | 10/1998 | Harthorn et al. | | |
| 6,158,718 A | 12/2000 | Lang et al. | | |
| 6,454,015 B1 | 9/2002 | Armstrong et al. | | |
| 6,929,244 B1 | 8/2005 | Law et al. | | |
| 7,165,619 B2 | 1/2007 | Fox et al. | | |
| 7,255,328 B2 | 8/2007 | Hunter | | |
| 7,309,058 B2 | 12/2007 | Hunter et al. | | |
| 7,325,783 B2 | 2/2008 | Hunter | | |
| 7,975,983 B2 | 7/2011 | Comeaux et al. | | |
| 8,087,181 B2 | 1/2012 | Rogers et al. | | |
| 2008/0029728 A1 | 2/2008 | Hunter et al. | | |
| 2008/0083892 A1 | 4/2008 | Fenton | | |
| 2008/0099710 A1 | 5/2008 | Jennings | | |

(Continued)

*Primary Examiner* — John K Fristoe, Jr.
*Assistant Examiner* — Marina Tietjen
(74) *Attorney, Agent, or Firm* — Bracewell & Giuliani LLP

(57) ABSTRACT

A gate valve and a method for making a gate valve for use with abrasive fracturing fluids, include provided enlarged spaces in the gate valve body wherein sand or other debris from the fracturing fluid may accumulate without affecting the operation of the gate of the gate valve.

18 Claims, 3 Drawing Sheets

(56) References Cited

U.S. PATENT DOCUMENTS

| | | |
|---|---|---|
| 2010/0115772 A1 | 5/2010 | Salisbury |
| 2010/0243936 A1* | 9/2010 | Nesje ............................ 251/282 |
| 2011/0068287 A1 | 3/2011 | Grimseth et al. |
| 2012/0024385 A1 | 2/2012 | Gharaibah et al. |
| 2012/0080634 A1 | 4/2012 | Fenton |
| 2012/0132842 A1 | 5/2012 | Phillips |

* cited by examiner

GATE VALVE

RELATED APPLICATION

This application claims the benefit and priority of U.S. Provisional Patent Application Ser. No. 61/285,838, filed Dec. 11, 2009, entitled GATE VALVE.

BACKGROUND OF THE INVENTION

1. Field of the Invention

The invention relates to gate valves in general, and in particular to gate valves for use in fracturing operations conducted in connection with wells for the production of hydrocarbons.

2. Description of the Related Art

In oilfield production operations, some wells may be stimulated to increase the production of hydrocarbons, such as oil and gas. Such techniques may include high-pressure, or hydraulic, fracturing of the well formation, known to the art as "fracing" a well formation. Generally, in this process a sand-bearing slurry or fracturing fluid, or "frac fluid", is pumped down into the formation surrounding the wellbore at very high pressure. The sand particles of the frac fluid become embedded in small cracks and fissures in the formation, wedging them open and, thus, increasing the flow of produced fluid. Typically, the fluids used during fracturing are often very abrasive. Gate valves may be used in connection with the wellhead during fracturing operations, through which pass the sand-bearing slurry, or frac fluid, as well as other debris generated in connection with the fracturing operations.

SUMMARY OF THE INVENTION

In accordance with the illustrative embodiments hereinafter described, the present gate valves include features which permit the gate valve to be utilized with abrasive fracturing fluids, and prevents the gate, or slab gate, of the gate valve from being affected by sand or other materials resulting from the fracturing operation accumulating in the internal cavity, or gate cavity, of the gate valve.

In accordance with another illustrative embodiment, a method for making a gate valve for use with an abrasive fracturing fluid provides enlarged spaces wherein sand, or other debris from the fracturing fluid may accumulate within the valve body.

BRIEF DESCRIPTION OF THE DRAWING

The present gate valve may be understood by reference to the following description taken in conjunction with the accompanying drawing, in which.

Figure 1:
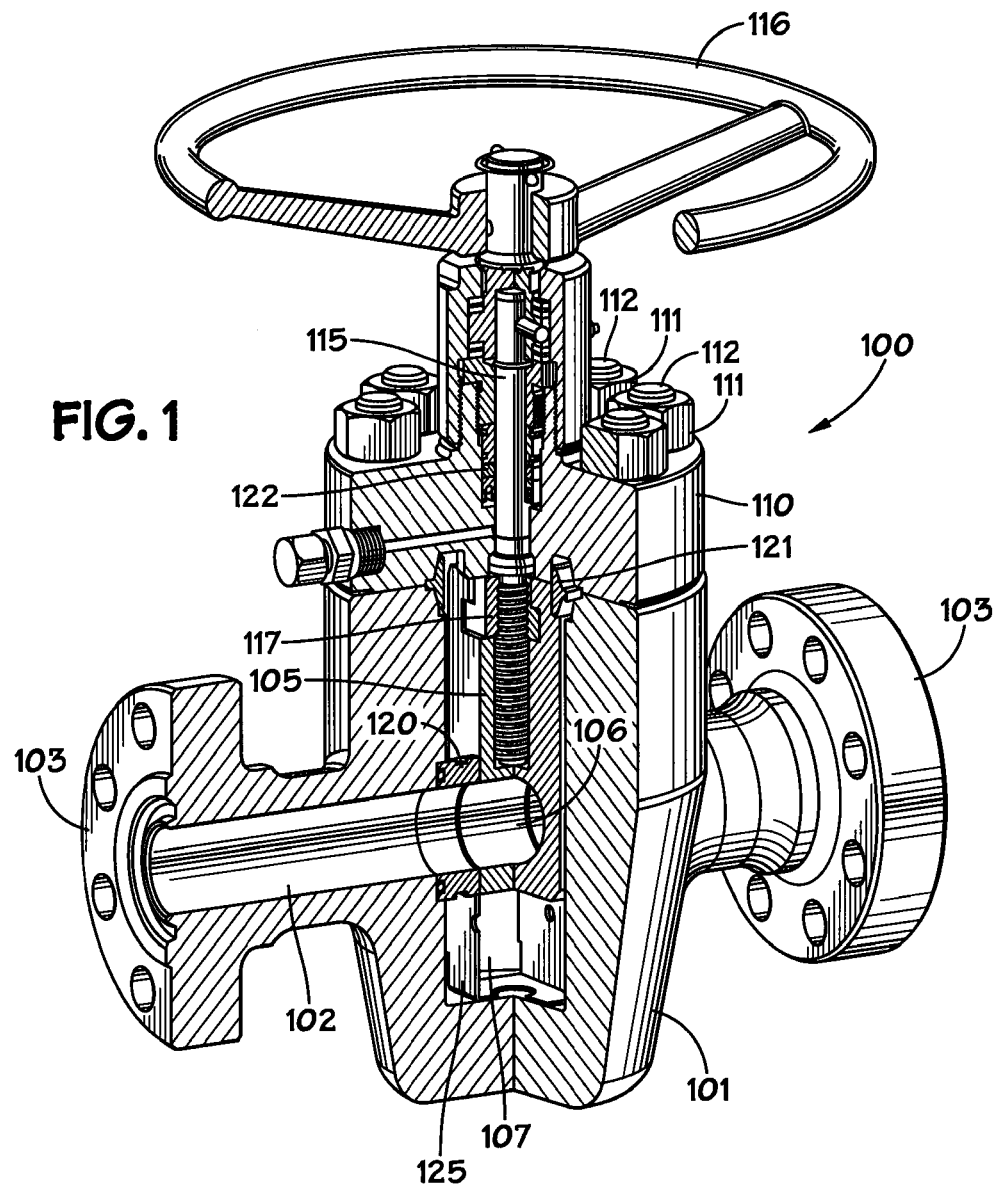
FIG. 1 is a perspective, partial cross-sectional view of a typical slab gate valve.

While certain embodiments of the present gate valve will be described in connection with the preferred illustrative embodiments shown herein, it will be understood that it is not intended to limit the invention to those embodiments. On the contrary, it is intended to cover all alternatives, modifications, and equivalents, as may be included within the spirit and scope of the invention as defined by the appended claims. In the drawing figures, which are not to scale, the same reference numerals are used throughout the description and in the drawing figures for components and elements having the same structure, and primed reference numerals are used for components and elements having a similar function and construction to those components and elements having the same unprimed reference numerals.

DETAILED DESCRIPTION OF THE ILLUSTRATIVE EMBODIMENTS

With reference to FIG. 1, a typical slab gate valve, or gate valve, 100 is illustrated. Gate valve 100 typically includes a valve body 101 which includes a cylindrical shaped fluid passageway 102 passing through valve body 101. At the ends of fluid passageway 102 are disposed conventional flange connectors 103 for securing gate valve 100 to other piping (not shown). As is known in the art, a threaded end connection, or threaded, end connector (not shown), may be used instead of flange connectors 103 to connect the gate valve 100 to the other piping.

Still with reference to FIG. 1, the upper end of valve body 101 is closed off by a bonnet member, or bonnet, 110 which is secured, preferably releasably secured, to the valve body 101 as by a plurality of nuts and bolts 111, 112, in a conventional manner. Conventional seals are utilized to seal bonnet 110 to valve body 101. Slab gate 105 is disposed within valve body 101 for upward or downward movement as by rotation of a stem, or stem member, 115 by rotating wheel 116 which causes the rotation of stem 115. The lower end of stem 115 is received within gate 105 as by a threaded connection 117 whereby upon rotation of valve wheel 116, stem 115 is rotated and slab gate 105 moves upwardly or downwardly with respect to stem 115, within gate valve 100, as stem 115 may only rotate within bonnet 110 and valve body 101.

In FIG. 1, gate 105 is illustrated in its upper position within valve body 101, whereby an opening, or gate opening, 106 in gate 105 is in a substantially mating, fluid transmitting relationship with the fluid passageway 102 of valve body 101, whereby fluid, such as fracturing fluid, or other fluids, may flow through valve body 101. Upon rotating stem 115, gate 105 may be moved downwardly within valve body 101, until the opening 106 of gate 105 is disposed at the lower end of the internal cavity, or gate cavity, 107 in valve body 101, at which time the gate 105 is in a substantially non-mating, non-fluid transmitting relationship with the fluid passageway 102 of valve body 101, and substantially blocks the passage of fluid through valve body 101. Gate valve 100 may be provided with metal-to-metal seals 120 between the gate 105 and the valve body 101, or any other suitable seals between gate 105 and valve body 101. A valve body/bonnet seal 121 may be provided between bonnet 110 and the upper end of valve body 101. Stem packing seals 122 may also be provided. A gate guide 125 may be provided in the gate cavity 107 at the lower end of valve body 101, to assist and guide the gate 105 as it travels downwardly within the gate cavity 107 in the lower end of valve body 101.

Figure 2:
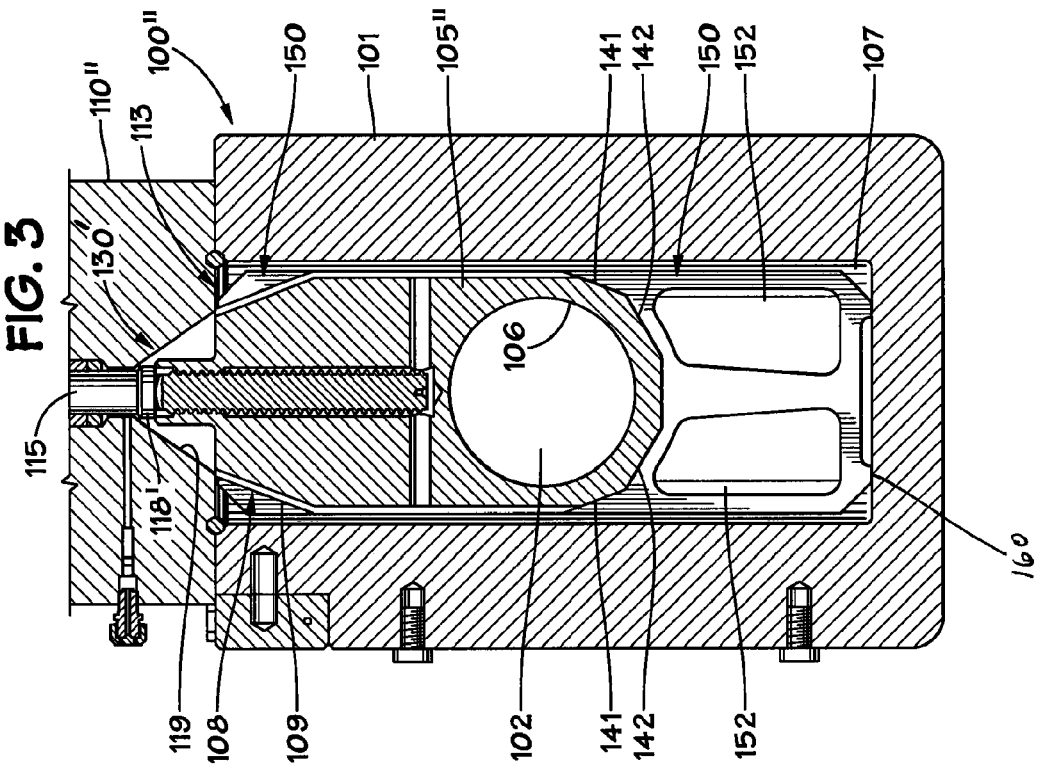
FIG. 2 is a partial cross-sectional view of an embodiment of the present gate valve, wherein the slab gate, or gate, is illustrated in its closed position within the gate valve.

With reference to FIG. 2, an embodiment of the present gate valve 100' is illustrated, which includes: valve body 101; bonnet 110'; stem 115, gate cavity 107 in valve body 101; valve body/body seal 121; slab gate, or gate, 105'; fluid passageway 102; and gate opening 106. The embodiment of the present gate valve 100' preferably does not include any gate guide 125 (FIG. 1) in the lower end of gate cavity 107 of valve body 101.

Still with reference to FIG. 2, the seating surface, or back seat area, 113 of the underside of bonnet 110', against which a portion, or seating surface, 118 of stem 115 may seat against, is machined to have a generally frustoconical configuration 130. Thus, there is an enlarged cavity, or space, 119 present around the portion, or seating surface, 118 of stem 115 disposed between the upper end of valve body 101 and the underside of bonnet 110'. The upper end 108 of gate 105' has its sides, or side wall surfaces, 109 slope and taper inwardly and upwardly toward the upper end 108 of the gate 105'. Each side of the lower end 104 of gate 105' has at least one, and preferably, a plurality, of side wall surfaces 140, such as side wall surfaces 141 and 142, which slope and taper downwardly and inwardly toward the lower end 104 of gate 105'. Thus, the lower end of the gate cavity 107 around gate 105' has an enlarged, or additional, space or volume not occupied by the lower end of gate 105'. The lower end 104 of gate 105' may be provided with a suitable spacer, or spacer member, 145 such as a cap screw 146, whereby upon gate 105' being disposed in its closed position, wherein fluid passageway 102 is generally blocked by the gate 105', as shown in FIG. 2, gate 105' will be properly spaced within the lower end of gate cavity 107 of valve body 101.

Alternatively, the lower end 104 of gate 105' has a semicircular shape approximately the configuration of side wall surfaces 141, 142, to provide the enlarged, or additional, space or volume not occupied by the lower end 104 of gate 105' in the lower end of gate cavity 107 of valve body 101.

The enlarged volume of space, or volume, present within gate cavity 107 between the interior surface of gate cavity 107 and the upper and lower ends 108, 104 of gate member 105', provide space for sand or other debris from the frac fluid, which may accumulate within valve body 101, to be present within the gate cavity 107 without interfering with the operation of the movement of gate 105' upwardly or downwardly within gate cavity 107 of gate valve 100'. Similarly, the enlarged area or cavity 119 around the portion 118 of stem 115 also assists in preventing any sand, which may accumulate between the upper end of valve body 101 and the bonnet 110', from interfering with the rotation of stem 115.

Figure 3:
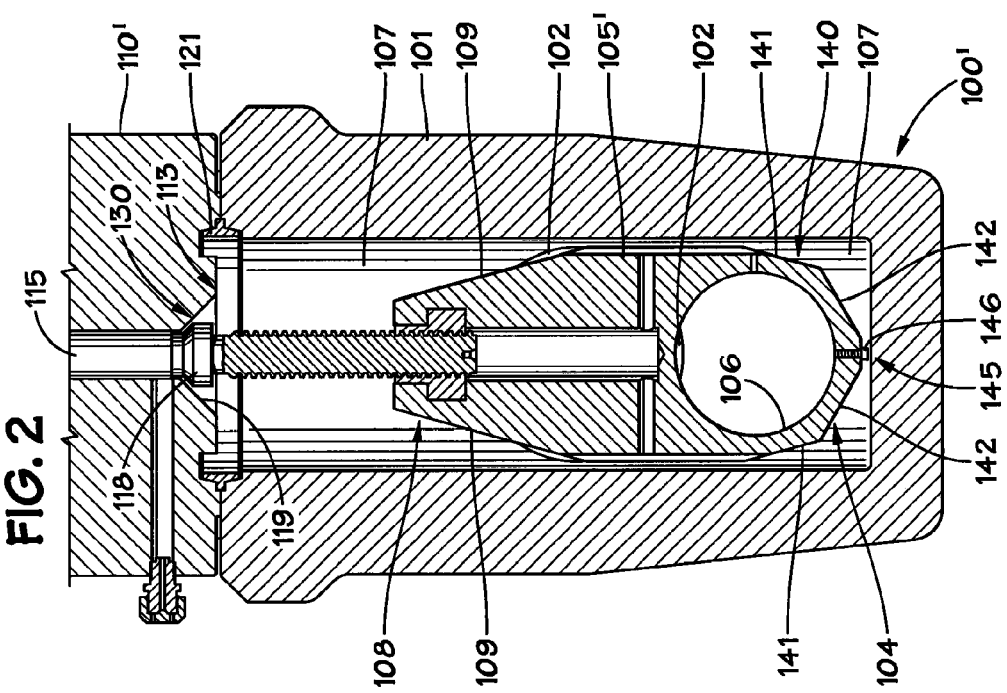
FIG. 3 is partial cross-sectional view of another embodiment of the present gate valve, illustrating the gate in its open position within the gate valve.
Figure 4:
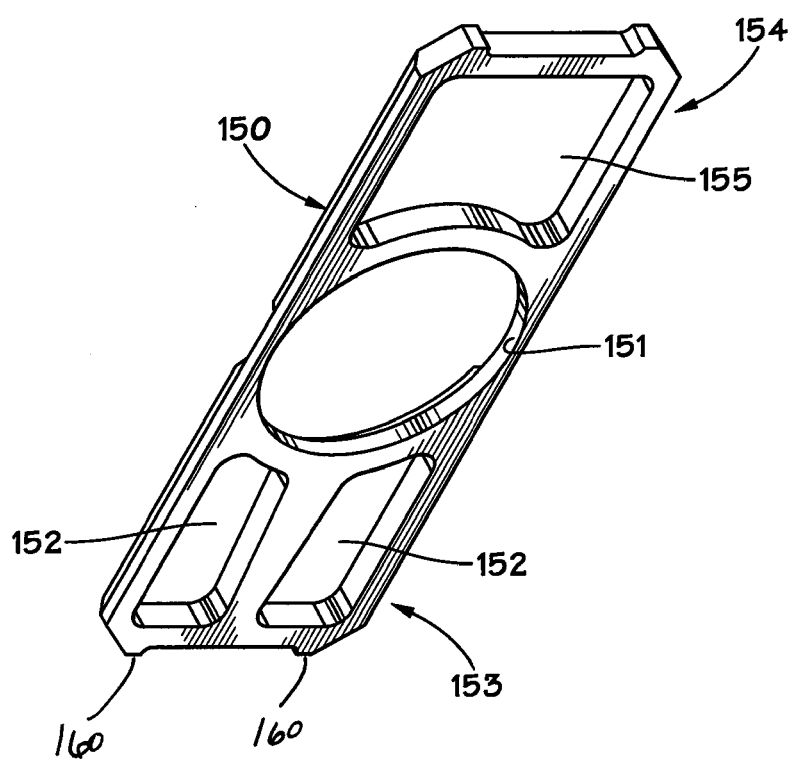
FIG. 4 is a perspective view of a retainer plate for use with the gate valve embodiment of FIG. 3.

With reference to FIG. 3, another embodiment of the present gate valve 100" is shown to include: a valve body 101; bonnet 110"; stem 115; flow passageway 102; gate opening 106; back seat area 113, with a generally frustoconical configuration 130'; gate 105" including upper tapered side wall surfaces 109 and lower tapered side wall surfaces 141, 142; and gate cavity 107. Gate valve 100" is illustrated in its open configuration wherein gate opening 106 is in a mating, fluid transmitting relationship with respect to flow passageway 102. In connection with the gate valve 100" of FIG. 3, at least one retainer plate 150 may be utilized on either side of the gate 105". As seen in FIGS. 3 and 4, the retainer plate 150 has a central opening 151 which mates with gate opening 106 when gate 105" is disposed in its upper, open, flow transmitting relationship with respect to fluid passageway 102 as illustrated in FIG. 3. In FIG. 3 the at least one retainer plate is shown disposed behind gate 105". Retainer plate 150 may also be provided with at least one, and preferably two, or any desired number of, additional openings 152 at its lower end 153 which is received within the lower end of gate cavity 107. As shown in FIGS. 3 and 4, portions of lower end 153 of retainer plate 150 define additional openings 152, and the combined cross-sectional area of openings 152 is greater than the cross-sectional area of the those portions of lower end 153 of retainer plate 150. The upper end 154 of retainer plate 150 may be preferably provided with at least one opening 155, or any number of desired openings 155, which are disposed in the upper end 154 of retainer plate 151 which is disposed in the upper end of gate cavity 107. As shown in FIG. 4, portions of upper end 154 of retainer plate 150 define additional opening 155, and the cross-sectional area of opening 155 is greater than the cross-sectional area of the those portions of upper end 154 of retainer plate 150. The lower end 153 of retainer plate 151 may be provided with at least one, and preferably two, spacer members 160 to space the lower end of the retainer plate 150 from the lower end of the gate cavity 107.

The underside of bonnet 110" with frustoconical configuration 130' has an enlarged area or cavity around the portion 118' of stem 115 to also assist in preventing any sand, which may accumulate between the upper end of valve body 101 and the bonnet 110", from interfering with rotation of stem 115.

Gate valve 100" operates in the same general manner as that of gate valve 100' and in addition the openings 152, 155 of retainer plate 150, also provide an additional space or volume within gate cavity 107 wherein undesired sand from the frac fluid may accumulate within gate cavity 107, without affecting the desired operation and movement of gate 105".

Specific embodiments of the present gate valve have been described and illustrated. It will be understood to those skilled in the art that changes and modifications may be made without departing from the spirit and scope of the inventions defined by the appended claims.

I claim:

1. A gate valve for a fluid, comprising:
   a gate having upper and lower ends, at least two upper and two lower side wall surfaces defining a plurality of lateral edges of the gate, the at least two lower side wall surfaces extending downward and inward from a widest point and transitioning to a lowermost point of the gate, and a gate opening extending through the gate, at least a portion of the gate opening being located between at least a portion of the at least two lower side wall surfaces;
   a valve body having a thud passageway passing through the valve body, and the gate being disposed within the valve body for upward or downward movement, whereby the gate opening may be moved between a first substantially mating, fluid transmitting relationship with the fluid passageway of the valve body defining a first gate position, and a second substantially non-mating, non-fluid transmitting relationship with the fluid passageway of the valve body defining a second gate position;
   the valve body having a gate cavity, having upper and lower ends, in which the gate moves upwardly and downwardly;
   the lower end of the gate cavity having an enlarged space below and outward from the at least two lower side wall surfaces in each of the first gate position and the second gate position, wherein sand or other debris from the fluid may accumulate; and
   at least one retainer plate disposed in the gate cavity, the at least one retainer plate having a central opening which mates with the gate opening of the gate when the gate opening is in the first substantially mating, fluid transmitting relationship, the at least one retainer plate having one or more additional openings, and a combined width of the one or more additional openings is greater than a width of a portion of the retainer plate proximate to the one or more additional openings, to provide an enlarged space for sand or other debris.

2. The gate valve of claim 1, wherein the lower end of the gate has at least four lower side wall surfaces which slope and taper downwardly and inwardly toward the lower end of the gate to provide the enlarged space for sand or other debris in the lower end of the gate cavity.

3. The gate valve of claim 1, wherein the lower end of the gate has a spacer member to space the gate from the lower end of the gate cavity when the gate opening is in the second substantially non-mating, non-fluid transmitting relationship.

4. The gate valve of claim 1, wherein the at least one retainer plate, has upper and lower ends, the one or more additional openings being located at the lower end of the at least one retainer plate to provide an enlarged space for sand or other debris in the lower end of the gate cavity.

5. The gate valve of claim 4, wherein the lower end of the at least one retainer plate has at least one spacer member to space the retainer plate from the lower end of the gate cavity and define a space between the retainer plate and the lower end of the gate cavity.

6. The gate valve of claim 1, wherein the at least one retainer plate, has upper and lower ends, the at least one additional opening being located at the upper end of the at least one retainer plate, providing an enlarged space for sand or other debris in the upper end of the gate cavity.

7. The gate valve of claim 1, wherein the at least two upper side wall surfaces of the upper end of the gate slope and taper upwardly and inwardly toward the upper end of the gate to provide an enlarged space for sand or other debris in the upper end of the gate cavity.

8. The gate valve of claim 1, wherein the upper end of the gate valve includes a bonnet, secured to an upper end of the valve body, the bonnet having a seating surface having a generally frustoconical configuration on the underside of the bonnet, with a stem member, having upper and lower ends, passing through the bonnet, the stem member having a seating surface which seats against the seating surface of the bonnet, and between the underside of the bonnet and the seating surface of the stem member is an enlarged space wherein sand, or other debris, from the fluid may accumulate.

9. The gate valve of claim 1, wherein the upper end of the gate valve includes a bonnet, secured to an upper end of the valve body, the bonnet having a seating surface having a generally frustoconical configuration on the underside of the bonnet, with a stem member, having upper and lower ends, passing through the bonnet, the stem member a portion disposed adjacent the seating surface of the bonnet, and between the underside of the bonnet and the portion of the stem member is an enlarged space wherein sand, or other debris, from the fluid may accumulate.

10. A method for making a gate valve for use with an abrasive fracturing fluid, comprising:
    providing a gate having upper and lower ends, at least two upper and two lower side wall surfaces defining a plurality of lateral edges of the gate, the at least two lower side wall surfaces extending downward and inward from a widest point and transitioning to a lowermost point of the gate, and a gate opening extending through the gate, at least a portion of the gate opening being located between at least a portion of the at least two lower side wall surfaces;
    providing a valve body having a fluid passageway passing through the valve body, and disposing the gate within the valve body for upward or downward movement, whereby the gate opening may be disposed in a first substantially mating, fluid transmitting relationship with the fluid passageway of the valve body defining a first gate position or in a second substantially non-mating, non-fluid transmitting relationship with the fluid passageway of the valve body defining a second gate position;
    providing the valve body with a gate cavity, having upper and lower ends, in which the gate moves upwardly and downwardly;
    providing the lower end of the gate cavity with an enlarged space below and outward from the at least two lower side wall surfaces in each of the first gate position and the second gate position, wherein sand or other debris from the abrasive fracturing fluid may accumulate;
    urging debris into the enlarged space by moving the gate between the first and second position; and
    providing the gate valve with at least one retainer plate and disposing the at least one retainer plate in the gate cavity, the at least one retainer plate having a central opening which mates with the gate opening of the gate, when the gate opening is in the first substantially mating, fluid transmitting relationship; and disposing in the at least one retainer plate one or more additional openings, a width of the one or more additional openings is greater than a width of a portion of the retainer plate proximate to the one or more additional openings to provide an enlarged space for sand or other debris.

11. The method of claim 10, including providing the lower end of the gate with at least four lower side wall surfaces and making the at least four lower side wall surfaces slope and taper downwardly and inwardly toward the lower end of the gate to provide the enlarged space for sand or other debris in the lower end of the gate cavity.

12. The method of claim 10, including disposing on the lower end of the gate a spacer member to space the gate from the lower end of the gate cavity when the gate opening is in the second substantially non-mating, non-fluid transmitting relationship.

13. The method of claim 10, wherein the at least one retainer plate has upper and lower ends, the method further comprising disposing the one or more additional openings in the lower end of the at least one retainer plate to provide an enlarged space for sand or other debris in the lower end of the gate cavity, and further comprising the step of urging the debris through the one or more additional openings by moving the gate from the first position to the second position.

14. The method of claim 13, including disposing on the lower end of the at least one retainer plate at least one spacer member to space the retainer plate from the lower end of the gate cavity and define a space between the retainer plate and the lower end of the gate cavity.

15. The method of claim 10, wherein the at least one retainer plate has upper and lower ends, the method further comprising disposing the at least one additional opening in the upper end of the at least one retainer plate, providing an enlarged space for sand or other debris in the upper end of the gate cavity, and further comprising the step of urging the debris through the one or more additional openings by moving the gate from the first position to the second position.

16. The method of claim 10, including making the at least two upper side wall surfaces of the upper end of the gate slope and taper upwardly and inwardly toward the upper end of the gate to provide an enlarged space for sand or other debris in the upper end of the gate cavity.

17. The method of claim 10, including: providing the upper end of the gate valve with a bonnet, secured to an upper end of the valve body; providing the bonnet with a seating surface having a generally frustoconical configuration on the underside of the bonnet; disposing a stem member, having upper and lower ends, to pass through the bonnet; providing the stem member with a seating surface which seats against the seating surface of the bonnet; and providing between the underside of the bonnet and the seating surface of the stem member an enlarged space wherein sand, or other debris, from the fracturing fluid may accumulate.

18. The method of claim 10, including: providing the upper end of the gate valve with a bonnet, secured to an upper end of the valve body; providing the bonnet with a seating surface having a generally frustoconical configuration on the underside of the bonnet; disposing a stem member, having upper and lower ends, to pass through the bonnet; providing the stem member with a portion disposed adjacent the seating surface of the bonnet; and providing between the underside of the bonnet and the portion of the stem member an enlarged space wherein sand, or other debris, from the fracturing fluid may accumulate.

* * * * *